United States Patent
Kobayashi et al.

(10) Patent No.: US 10,759,097 B2
(45) Date of Patent: Sep. 1, 2020

(54) MOLDED ARTICLE AND USE OF SAME

(71) Applicant: Kureha Corporation, Tokyo (JP)

(72) Inventors: Fuminori Kobayashi, Tokyo (JP); Takahiro Watanabe, Tokyo (JP); Hiroyuki Sato, Tokyo (JP); Yoshinori Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/477,668

(22) PCT Filed: Dec. 21, 2017

(86) PCT No.: PCT/JP2017/045959
§ 371 (c)(1),
(2) Date: Jul. 12, 2019

(87) PCT Pub. No.: WO2018/139128
PCT Pub. Date: Aug. 2, 2018

(65) Prior Publication Data
US 2019/0358873 A1 Nov. 28, 2019

(30) Foreign Application Priority Data

Jan. 27, 2017 (JP) .................. 2017-013704

(51) Int. Cl.
*B29C 45/00* (2006.01)
*C08G 63/06* (2006.01)
*B29K 67/00* (2006.01)

(52) U.S. Cl.
CPC .......... *B29C 45/0053* (2013.01); *C08G 63/06* (2013.01); *B29C 2791/007* (2013.01);
(Continued)

(58) Field of Classification Search
CPC . B29C 45/0053; B29C 45/00; B29C 45/0055; B29C 2945/76531;
(Continued)

(56) References Cited

U.S. PATENT DOCUMENTS 2,668,162 A 2/1954 Lowe
5,830,991 A 11/1998 Shiiki et al.
(Continued)

FOREIGN PATENT DOCUMENTS

CN 1826380 A 8/2006
CN 1826380 A 8/2006
(Continued)

OTHER PUBLICATIONS

International Search Report of the International Searching Authority for PCT/JP2017/045959 dated Mar. 27, 2018.
(Continued)

*Primary Examiner* — Joseph S Del Sole
*Assistant Examiner* — Jamel M Nelson
(74) *Attorney, Agent, or Firm* — Birch, Stewart, Kolasch & Birch, LLP

(57) ABSTRACT

Provided is a molded article comprising an aliphatic polyester. The aliphatic polyester is at least one selected from the group consisting of polyglycolic acid and a copolymer of a glycolic acid monomer and a monomer other than the glycolic acid monomer. The molded article has a uniaxial compressive strength at a temperature of 23° C. of greater than 250 MPa and not greater than 350 MPa.

3 Claims, 1 Drawing Sheet

(52) U.S. Cl.
CPC .............. *B29C 2945/76498* (2013.01); *B29C 2945/76531* (2013.01); *B29K 2067/043* (2013.01)

(58) Field of Classification Search
CPC .......... B29C 2945/76498; B29C 49/06; B29C 2791/007; C08G 63/06; B29K 2067/043
See application file for complete search history.

(56) References Cited

U.S. PATENT DOCUMENTS

| | | | |
|---|---|---|---|
| 5,853,639 | A | 12/1998 | Kawakami et al. |
| 9,644,453 | B2 | 5/2017 | Okura et al. |
| 10,030,465 | B2 | 7/2018 | Okura et al. |
| 2008/0045627 | A1 | 2/2008 | Rose |
| 2012/0046414 | A1 | 2/2012 | Sato et al. |
| 2014/0076571 | A1 | 3/2014 | Frazier et al. |
| 2015/0061192 | A1* | 3/2015 | Sun .......................... B29C 49/22 264/456 |
| 2015/0252646 | A1* | 9/2015 | Okura ................ E21B 33/1208 166/192 |
| 2015/0290858 | A1 | 10/2015 | Okura et al. |
| 2018/0222103 | A1 | 8/2018 | Okura et al. |

FOREIGN PATENT DOCUMENTS

| | | | | | |
|---|---|---|---|---|---|
| CN | 102405257 | A | | 4/2012 | |
| CN | 102405257 | A | | 4/2012 | |
| CN | 104640684 | A | | 5/2015 | |
| CN | 104640684 | A | | 5/2015 | |
| CN | 105437442 | A | * | 3/2016 | |
| CN | 105437442 | A | | 3/2016 | |
| CN | 105601891 | A | | 5/2016 | |
| CN | 105601891 | A | | 5/2016 | |
| JP | H09328481 | A | | 12/1997 | |
| JP | H1060136 | A | | 3/1998 | |
| JP | H10337772 | A | | 12/1998 | |
| JP | 2000119269 | A | | 4/2000 | |
| JP | 2003020344 | A | | 1/2003 | |
| JP | 2004338097 | A | | 12/2004 | |
| JP | 2015113614 | A | | 6/2015 | |
| WO | WO-9938630 | A1 | * | 8/1999 | ............ B22D 19/14 |
| WO | WO2014024827 | A1 | | 2/2014 | |
| WO | WO2014077302 | A1 | | 5/2014 | |
| WO | WO2014092067 | A1 | | 6/2014 | |

OTHER PUBLICATIONS

Translation of the International Search Report of the International Searching Authority for PCT/JP2017/045959 dated Mar. 27, 2018.
Written Opinion of the International Searching Authority for PCT/JP2017/045959 dated Mar. 27, 2018.
Cruho K., Kobayashi, H., Suzuki, J., Tokuhara, S., Tanabe, M., Abstract only for 'Ring-Opening Polymerization of Glycolide', Die Makromolekulare Chemie 100 (1967), Nr. 2397, p. 262.
Translation of the Written Opinion of the International Searching Authority for PCT/JP2017/045959 dated Mar. 27, 2018.
Chinese Office Action and Search Report, dated Nov. 15, 2019 for Chinese Application No. 201780075332.8, with an English translation of the Chinese Office Action.
First Office Action of the Chinese National Intellectual Property Administration for CN201780075332.8/PCT/JP2017/045959 dated Nov. 15, 2019.
Search Report of the Chinese National Intellectual Property Administration for CN201780075332.8/PCT/JP2017/045959 dated Nov. 7, 2019.
International Preliminary Report on Patentability Chapter I for PCT/JP2017/045959 dated Jul. 30, 2019.

* cited by examiner

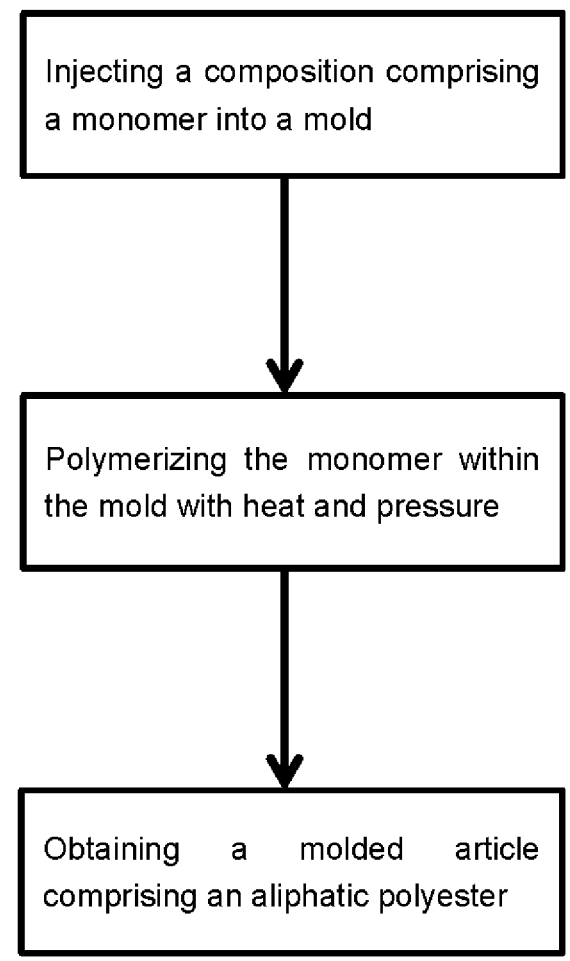

MOLDED ARTICLE AND USE OF SAME

TECHNICAL FIELD

The present invention relates to a molded article and the use of the same.

BACKGROUND ART

A molded article formed from polyglycolic acid (hereinafter, also referred to as PGA), which is one type of aliphatic polyester, is used as a member for well drilling that requires a large compressive strength. It has been reported that the uniaxial compressive strength of a known molded article made from PGA (hereinafter, also referred to as a PGA molded article) is in a range of from 50 to 200 MPa (Patent Document 1). Note that in the present specification, the term "well" is a general term for an oil well and a gas well.

CITATION LIST

Patent Literature

Patent Document 1: US 2014/0,076,571

SUMMARY OF INVENTION

Technical Problem

With respect to a member for well drilling, a demand exists for a reduction in the size of members, and as a part of a demand for lower costs, there is thus a demand for a reduction in the amount of material used and the like. In order to satisfy the above demands, there is a need to further increase the uniaxial compressive strength that has been reported thus far. The present invention was conceived in light of such circumstances. The present inventors examined how to realize a PGA molded article that has a uniaxial compressive strength of greater than 200 MPa, which is the maximum uniaxial compressive strength reported in the past, and as a result, successfully developed a PGA molded article with a high uniaxial compressive strength of greater than 250 MPa.

Solution to Problem

In order to solve the above-mentioned problem, a molded article according to one aspect of the present invention contains an aliphatic polyester; the aliphatic polyester being at least one selected from the group consisting of polyglycolic acid and a copolymer of a glycolic acid monomer and a monomer other than the glycolic acid monomer; and the molded article having a uniaxial compressive strength at a temperature of 23° C. of greater than 250 MPa and not greater than 350 MPa.

A downhole tool according to one aspect of the present invention includes the molded article described above.

A method for well drilling according to one aspect of the present invention includes performing well drilling or well processing with the downhole tool described above.

A method of producing a molded article according to one aspect of the present invention is a method of producing a molded article containing an aliphatic polyester, the method including: an injection step of injecting a composition containing monomers into a mold; and a molding step of molding a molded article by polymerizing the monomers at a temperature of from 150° C. to 200° C. under a pressurized condition with a pressure of not less than 10 MPa and less than 180 MPa, wherein the monomers include glycolic acid monomers, and a content of the glycolic acid monomers in the composition is not less than 70 mass %.

BRIEF DESCRIPTION OF THE DRAWINGS

The FIGURE describes a method of making a molded article according to one embodiment of the present invention.

Advantageous Effects of Invention

According to one aspect of the present invention, a molded article having a high uniaxial compressive strength can be provided.

DESCRIPTION OF EMBODIMENTS

Hereinafter, embodiments of the present invention will be described. In the present specification, the use of the term "monomers" alone refers collectively to a glycolic acid monomer and monomers other than a glycolic acid monomer.

Glycolic Acid

Glycolic acid is a compound represented by the chemical formula (1) below.

[Chemical Formula 1]

(1)

Glycolide

Glycolide is a compound represented by the chemical formula (2) below and is a cyclic ester formed from two molecules of glycolic acid.

[Chemical Formula 2]

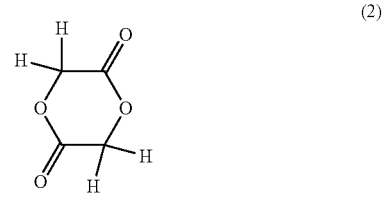

(2)

The method of producing glycolide is not particularly limited, but glycolide can typically be obtained by thermal depolymerization of a glycolic acid oligomer. Examples of methods for depolymerizing a glycolic acid oligomer that can be used include a melting and depolymerizing method described in the specification of U.S. Pat. No. 2,668,162, a solid phase depolymerization method described in JP 2000-119269 A, and a solution depolymerization method described in JP 09-328481 A. Glycolide obtained as a cyclic condensate of a chloroacetate reported by K. Chujo et al. Die Makromolekulare Cheme, 100 (1967), 262-266 can also be used.

In the present specification, glycolic acid and glycolide are collectively referred to as glycolic acid monomers. The glycolic acid monomers that are used are particularly preferably of high purity.

Polyglycolic Acid

In the present specification, the term polyglycolic acid (hereinafter, also referred to as PGA) refers to a homopolymer obtained by polymerizing glycolic acid monomers.

The method of producing PGA is not particularly limited. PGA can be produced, for example, by condensation polymerization (polycondensation) of glycolic acid or ring-opening polymerization of glycolide. The method of producing PGA through ring-opening polymerization of glycolide facilitates an increase in the molecular weight of the PGA and is thus preferable.

For example, a catalyst such as an organic tin carboxylate, tin halide, or antimony halide and a co-catalyst such as a phosphate can be used as the catalyst for ring-opening polymerization. The glycolide can be polymerized, for example, by adding a small amount of a catalyst to the glycolide and heating at a temperature within a range of from 120° C. to 230° C. for a predetermined period of time to perform ring-opening polymerization. Note that the PGA according to the present embodiment includes PGA that contains a catalyst used for polymerization.

The weight average molecular weight of the PGA is preferably from 50,000 to 1,000,000, more preferably from 60,000 to 800,000, and even more preferably from 70,000 and to 500,000. Setting the weight average molecular weight of the PGA to be within the range described above provides advantages that the polymerization rate does not decrease dramatically when producing the PGA through polymerization, and the PGA obtained by polymerization tends to exhibit a high uniaxial compressive strength.

Monomer Other than Glycolic Acid Monomer

The monomer other than the glycolic acid monomer according to the present embodiment is not particularly limited as long as it is a monomer that is copolymerizable with glycolic acid or glycolide. Examples of such a monomer include hydroxycarboxylic acids, lactides, and lactones. Examples of the hydroxycarboxylic acids include lactic acid, 2-hydroxyacetic acid, 2-hydroxypropanoic acid, 2-hydroxybutyric acid, 3-hydroxypropanoic acid, and 4-hydroxybutanoic acid. Examples of lactides include lactide that is a dimer of lactic acid, and examples of lactones include γ-caprolactone, β-propiolactone, and β-butyrolactone.

Copolymer

The copolymer according to the present embodiment is a copolymer that is obtained by copolymerizing a glycolic acid monomer and a monomer other than the glycolic acid monomer. The proportion of the glycolic acid monomer to all of the monomers included in the copolymer is not particularly limited but is preferably not less than 80 mass % and less than 100 mass %, more preferably from 80 mass % to 99 mass %, and even more preferably from 80 mass % to 95 mass %. When the proportion of the glycolic acid monomer is within the range described above, an effect that the hydrolyzability of the molded article containing the copolymer can be controlled to a desired value is exhibited.

The method of producing the copolymer is not particularly limited. For example, the copolymer can be produced by condensation polymerization of the glycolic acid monomer and the monomer other than the glycolic acid monomer, or by ring-opening polymerization between glycolide and a cyclic ester other than glycolide.

The weight average molecular weight of the copolymer is preferably from 50,000 to 1,000,000, more preferably from 60,000 to 800,000, and even more preferably from 70,000 to 500,000. Setting the weight average molecular weight of the copolymer to be within the range described above provides advantages that the polymerization rate does not decrease dramatically when producing the PGA through polymerization, and the copolymer obtained by polymerization tends to exhibit a high uniaxial compressive strength.

Aliphatic Polyester

The aliphatic polyester according to the present embodiment is any of (i) PGA, (ii) a copolymer of a glycolic acid monomer and a monomer other than the glycolic acid monomer, or (iii) a mixture of PGA and a copolymer of a glycolic acid monomer and a monomer other than the glycolic acid monomer. The copolymer may be one type of copolymer or a mixture of a plurality of types of copolymers.

When the aliphatic polyester is a mixture of PGA and a copolymer of a glycolic acid monomer and a monomer other than the glycolic acid monomer, the proportion of PGA is not particularly limited, but is preferably not less than 1 mass % and less than 100 mass %, more preferably from 10 mass % to 99 mass %, and even more preferably from 30 mass % to 99 mass %. When the proportion of PGA is within the range described above, an effect that the molded article formed from an aliphatic polyester tends to exhibit a high uniaxial compressive strength is provided.

Furthermore, when the aliphatic polyester is a mixture of PGA and a copolymer of a glycolic acid monomer and a monomer other than the glycolic acid monomer, the method of producing the aliphatic polyester is not limited to a method of mixing the PGA with a copolymer of a glycolic acid monomer and a monomer other than the glycolic acid monomer. For example, an aliphatic polyester in which PGA and a copolymer of a glycolic acid monomer and a monomer other than the glycolic acid monomer are mixed at a predetermined ratio can be produced by mixing a glycolic acid monomer with a monomer other than the glycolic acid monomer at a predetermined ratio to cause polymerization.

The aliphatic polyester according to the present embodiment may include a thermal stabilizer, a photostabilizer, a plasticizer, a reinforcing material, an end-capping agent and the like as necessary as long as the object of the present embodiment is not impeded. In particular, the inclusion of the reinforcing material such as a filler facilitates the exhibition of a high uniaxial compressive strength. For example, when the raw material of the aliphatic polyester is PGA, a copolymer of a glycolic acid monomer and a monomer other than the glycolic acid monomer, or a mixture thereof, it is believed that a catalyst that is used when producing the PGA or the copolymer of a glycolic acid monomer and a monomer other than the glycolic acid monomer is included in the aliphatic polyester. Such aliphatic polyesters containing the catalyst are also included in the aliphatic polyesters according to the present embodiment.

Composition

The composition according to the present embodiment is used to produce a molded article formed from an aliphatic polyester and includes a glycolic acid monomer. When the aliphatic polyester contains a copolymer of a glycolic acid monomer and a monomer other than the glycolic acid monomer, the composition contains a monomer other than the glycolic acid monomer. In this case, the content of the glycolic acid monomer in the composition is not less than 70 mass %. When the content of the glycolic acid monomer is within the range described above, an effect that a high uniaxial compressive strength tends to be exhibited is provided.

Preferably, the glycolic acid monomer included in the composition is glycolide. The use of glycolide as the glycolic acid monomer yields an effect of achieving a low concentration of carboxylic acids derived from the monomers in the composition and of being able to suppress the hydrolysis of the aliphatic polyester.

The composition may contain a polymerization initiator. Examples of the polymerization initiator that can be used include compounds having hydroxyl groups such as water, 1-dodecyl alcohol, propylene glycol, and glycerin. The polymerization initiator is preferably 1-dodecyl alcohol or propylene glycol. When 1-dodecyl alcohol or propylene glycol is used as the polymerization initiator, a straight-chain polymer is obtained, and an effect that a molded article having a high degree of crystallization and a high uniaxial compressive strength is easily obtained is provided. The amount of the polymerization initiator in the composition correlates to the molecular weight of the target polymer and is preferably from 0.01 mass % to 1 mass % relative to the total mass of the glycolide, lactides, and lactones in the composition. When the content of the polymerization initiator is within the range described above, an effect of being able to obtain a polymer that exhibits a high uniaxial compressive strength is exhibited.

The composition may contain a catalyst. Examples of the catalyst that can be used include tin dichloride dihydrate, tin octanoate, antimony oxide, magnesium chloride, and aluminum chloride. Preferably, the catalyst is tin dichloride dihydrate. An effect of less coloration of the composition is exhibited by using tin dichloride dihydrate as the catalyst. The content of the catalyst in the composition is preferably from 1 ppm to 10,000 ppm, more preferably from 3 ppm to 3,000 ppm, and even more preferably from 10 ppm to 1,000 ppm. Effects of suppressing the generation of excessive heat by the polymerization of the monomers and of being able to carry out polymerization at a polymerization reaction rate with high productivity are exhibited by setting the content of the catalyst to be within the range described above.

The composition according to the present embodiment may include a thermal stabilizer, a photostabilizer, a plasticizer, an end-capping agent and the like as necessary as long as the object of the present embodiment is not impeded.

Method of Producing Molded Article

The method of producing a molded article according to the present embodiment is not particularly limited as long as the method is capable of producing the molded article according to the present embodiment. For example, a molded article may be molded from pellets of PGA produced from monomers, or the molded article may be molded by a method of molding while polymerizing the monomer without the production of pellets (molding step). Examples of the molding method include a method of solidification and extrusion and a method of cast polymerization.

Preferably, the method of producing a molded article according to the present embodiment is a production method in which a molded article is molded by injecting a composition into a mold (injection step) and polymerizing the monomers inside the mold. By polymerizing the monomers without the production of pellets, the method of producing a molded article can be simplified.

In the present embodiment, the polymerization of the monomers is performed under a pressurized condition at a pressure of not less than 10 MPa and less than 180 MPa, preferably from 30 MPa to 175 MPa, and more preferably from 50 MPa to 170 MPa. The formation of voids inside the molded article can be prevented by polymerizing the monomers under such pressurized condition.

The pressurization method is not particularly limited. In the present embodiment, pressurization is preferably performed by immersing, into a liquid, the mold into which the composition has been injected and sealed and then pressurizing the liquid. According to the above-described configuration, the composition can be pressurized at an isostatic pressure, and thus an effect of being able to obtain a molded article with a uniform density is exhibited. Additionally, according to the above configuration, an effect of suppressing the generation of voids inside the molded article, and an effect of suppressing cracking of the molded article due to the pressure distribution of pressurization are exhibited.

The method for pressurizing the liquid is not particularly limited. For example, a method of pressurizing the liquid using a piston and a method of pressurizing using a pump can be used. Preferably, the liquid is pressurized using a piston. According to the above-described configuration, an effect of the low-pressure fluctuation of the liquid is exhibited.

The liquid for immersing the mold into which the composition is injected is not particularly limited, and for example, water or silicone oil can be used. Preferably, the liquid for immersing the composition is silicone oil. When silicone oil is used, the silicone oil can be heated to approximately 300° C., and therefore the composition can be placed under a temperature condition of up to approximately 300° C.

In the present embodiment, the monomers are polymerized at a temperature of from 140° C. to 250° C., preferably at a temperature of from 145° C. to 230° C., and more preferably at a temperature of from 150° C. to 200° C. The monomers can be polymerized at a suitable polymerization rate by carrying out the polymerization of the monomers at the temperature condition described above. In addition, for a case in which PGA is produced, crystallization can be carried out simultaneously with the progression of polymerization by performing polymerization at a temperature of 200° C. or lower. Even at a polymerization temperature of 200° C. or higher, crystallization can be carried out by maintaining at a temperature of 200° C. or lower after the completion of polymerization. Note that in the present embodiment, the temperature condition described above is the temperature condition to which a mold into which a composition containing a monomer is injected is exposed. For example, in embodiments where a mold into which a composition is injected is immersed in a liquid and heated, the temperature condition refers to the temperature of the liquid for immersing the mold into which the composition is injected.

Furthermore, in the present embodiment, the mold into which the composition is injected may be heated at 170° C. for approximately 10 minutes before pressurizing. According to the above configuration, the glycolic acid monomer in the composition can be completely melted prior to pressurization, and therefore, shape defects in the molded article and damage to the rubber mold do not easily occur, and the composition can be favorably pressurized.

The polymerization time is not particularly limited as long as the polymerization time is a time at which the monomers can be sufficiently polymerized, and the polymerization time can be adjusted in accordance with the temperature and pressure conditions and the like. The polymerization time can also be adjusted according to the catalyst concentration. The polymerization time is preferably from 1 hour to 48 hours. An effect of being able to improve the productivity of the molded article and an effect of being able to suppress the generation of heat by polymerization are exhibited by setting the polymerization time to be within the range described above.

The mold used in the present embodiment is preferably flexible. The flexibility of the mold allows the composition within the mold to be suitably pressurized. The material of the mold is not particularly limited. For example, a mold made of silicone rubber or fluororubber can be used. When the material of the mold is silicone rubber or fluororubber, an effect of being able to use the mold at the polymerization temperature of the monomers according to the present embodiment and an effect that the rubber is not easily deteriorated by the monomer and thus reusable are exhibited.

The method of sealing the mold into which the composition is injected is not particularly limited. For example, the mold can be sealed through a method of sealing the injection port of the mold with a silicone plug. Preferably, the mold into which the composition is injected is sealed by a method of sealing the injection port of the mold with a silicone plug.

In the present embodiment, the composition is preferably degassed after the composition is injected into the mold. By degassing the composition, the surface of the molded article can be smoothly formed, and the formation of voids inside the molded article can be prevented. The method of degassing is not particularly limited, and for example, degassing can be performed by vacuum suctioning or the like. The mold into which the molded article is injected and sealed may be further put into a bag made of polyethylene terephthalate (PET) or the like, and then the mouth of the bag may be sealed. According to the above configuration, it is possible to prevent the composition from leaking out from gaps of the silicone mold when pressurized and from contaminating the liquid or the like for immersing the composition.

A method of pressurizing and molding a composition by immersing, in a liquid, a flexible mold into which the composition is injected and sealed and pressurizing the liquid under a predetermined temperature condition is referred to as a warm isostatic pressing method. As a method for producing a molded article according to the present embodiment, a warm isostatic pressing (also referred to as WIP) method can be suitably used. As a device for producing a molded article using the WIP method, a WIP device available from Kobe Steel, Ltd. can be used for example.

Molded Article

The molded article according to the present embodiment is formed from the aliphatic polyester according to the present embodiment and refers to a molded article formed using the aliphatic polyester, and the shape and size thereof are not particularly limited. Furthermore, the molded article may be a molded article that is used without secondary molding or may be a material for machining that is secondarily molded by machining. The molded article according to the present embodiment has a high uniaxial compressive strength and therefore can be suitably used as a molded article that requires a high strength. Examples of molded articles requiring a high strength include members used for well drilling or well processing. Examples of such members include frac balls, plugs for well drilling, mandrels (core rods), and rings. The size of such a member is not particularly limited, but may be set to a size according to the purpose such as, for example, a screw having a diameter of approximately 1 cm or a columnar mold having a diameter of 12 cm and a height of 30 cm. The molded article according to an embodiment in which the molded article is one that is used without secondary molding, and the material for machining before secondary molding may be molded articles that are larger than particles with a diameter of 5 mm. When the molded article is larger than 5 mm diameter particles, differences in the conditions under which the monomers polymerize easily occur inside the molded article, and the density of the molded article tends to be not uniform. However, according to the present embodiment, a molded article with uniform density can be provided, and therefore even for a molded article larger than 5 mm diameter particles, it can be formed with a uniform density.

Material for Machining

The molded article according to the present embodiment is preferably a material for machining. Note that in the present specification, a material for machining is a molded article for molding into a secondary molded article such as a variety of resin parts through machining such as cutting, drilling, and shearing. Almost no voids are present inside the material for machining according to the present embodiment, and therefore secondary molded articles can be formed with a good yield. The shape and application of secondary molded articles are not particularly limited. The secondary molded article according to the present embodiment has a high uniaxial compressive strength and therefore can be suitably used in applications that require a high strength. For example, the secondary molded article can be used as a member that is used in well drilling or well processing. Examples of such members include a downhole tool; and a frac ball, a plug for well drilling, a mandrel, and a ring, which are members for a downhole tool, as described below.

Frac Ball

The molded article according to the present embodiment is preferably a frac ball. A frac ball is a member that is used to adjust the position at which a fracture is formed when implementing hydraulic fracturing. Details of hydraulic fracturing are described in JP 2016-160694 A. Since the frac ball is a member that requires a particularly high strength, the high uniaxial compressive strength of the molded article can be suitably utilized. The shape of the frac ball is not particularly limited and can be, for example, a known shape, and specifically, the frac ball can be formed, for example, in the shape described in WO 2014/024827.

Mandrel

The molded article according to the present embodiment is preferably a mandrel provided in a plug for well drilling. Since the mandrel is a member that requires a particularly high strength, the high uniaxial compressive strength of the molded article can be suitably utilized. The shape of the mandrel is not particularly limited and can have a known shape for example. The mandrel may have a hollow portion, may have a shape with a diameter that varies along the axial direction, or may have a shape having a fixed part, a step, a recess, a protrusion, or the like on the outer surface. The mandrel can be, for example, a round rod having a diameter of from 20 to 200 mm or a hollow tube with an outer diameter of from 50 to 200 mm and an inner diameter of from 5 to 100 mm. Furthermore, the mandrel can be a hollow tube having a shape in which the inner diameter is uniform and the outer diameter of a portion, for example, an end part is enlarged. Note that a plug for well drilling refers to a plug for plugging and fixing a borehole. Additionally, "borehole" refers to a hole provided for forming a well and is also referred to as a "downhole". In the present embodiment, the plug for well drilling is provided with, for example, a mandrel (which may be solid or have a hollow portion) and various downhole tool members that are placed on an outer circumferential surface that is orthogonal to the axial direction of the mandrel.

Downhole Tool

The molded article according to the present embodiment is preferably used as a member for a downhole tool. The downhole tool requires a high level of strength, and therefore the high uniaxial compressive strength of the molded article can be suitably utilized. Note that in the present specification, a device that is installed in a well and used for well drilling or various types of well processing such as well plugging and fracturing, or a member of such device is referred to as a downhole tool. The shape of the downhole tool is not particularly limited and, for example, can have a known shape.

Portion Located at the Deepest Part of the Molded Article

In the present embodiment, a "portion located at the deepest part of the molded article" means a continuous portion of the molded article that includes the location farthest from all the surfaces of the molded article. When the portion located at the deepest part of the molded article is evaluated, in a case where the molded article is a solid cylinder for example, a test piece may be cut so as to include a region on the central axis of the cylinder and a position at half the height of the cylinder. In a case where the molded article is tubular (when having a hollow portion) for example, the test piece may be cut so as to include a region at a position of half the thickness of a side wall of the tube and at a position of half the height of the tube.

Portion Located on the Surface of the Molded Article

In the present embodiment, a "portion located on the surface of the molded article" means a continuous portion of the molded article that includes at least one point of the surface of the molded article. When the portion located on the surface of the molded article is evaluated, in a case where the molded article is a solid cylinder for example, a test piece may be cut so as to include at least one point of a side wall surface of the cylinder. In a case where the molded article is tubular (when having a hollow portion) for example, the test piece may be cut so as to include at least one point of an outer wall surface of the tube.

Uniaxial Compressive Strength

In the present specification, the uniaxial compressive strength refers to a value obtained by dividing the maximum compressive load that the test piece can withstand by the cross-sectional area of the test piece perpendicular to the compressive force. In the present specification, the uniaxial compressive strength refers to a value that is measured according to JIS K7178.

The matter of the uniaxial compressive strength of the molded article according to the present embodiment being within a prescribed range means that the uniaxial compressive strength falls within the prescribed range even when the uniaxial compressive strength is measured using a test piece cut out from any part of the molded article. In the present embodiment, the uniaxial compressive strength of the portion located at the deepest part of the molded article and the uniaxial compressive strength of the portion located on the surface of the molded article were measured respectively. In general, since voids are easily formed at the portion located at the deepest part of the molded article, the uniaxial compressive strength is low, and on the other hand, at portions located on the surface of the molded article, voids are not easily formed and thus the uniaxial compressive strength is high.

Depending on the shape of the molded article, the cutting of the test piece may be difficult. In this case, the uniaxial compressive strength may be evaluated in the same manner as in a case where the entire molded article is regarded as a test piece and the test piece is cut out.

With the molded article according to the present embodiment, the uniaxial compressive strength at a temperature of 23° C. is greater than 250 MPa but not greater than 350 MPa, preferably from 260 MPa to 350 MPa, and more preferably from 270 MPa to 350 MPa. When the uniaxial compressive strength is within the range described above, the molded article can be suitably used as a member used for well drilling.

Density

In the present specification, the density of the test piece means an apparent density that takes into account the voids present in the interior of the test piece but does not take into account the open pores of the test piece. In the present specification, the term "void" refers to a closed pore that is not connected with the surface and the inner space of the molded article. Also, in the present specification, density refers to a value measured according to the Archimedes' method (JIS Z8807). Note that an open pore is a pore that is connected with the surface and the inner space of the molded article. When the density is high, the test piece can be evaluated as having few voids present in the interior of the test piece.

When the molded article is large, the uniformity of the density of the molded article can be evaluated by cutting out a test piece from the molded article, and then determining, as described below, the density of the portion located at the deepest part of the molded article and the density of a portion located on the surface of the molded article. When the molded article is small and it is difficult to cut out a test piece, it is possible to evaluate whether the density of the molded article is sufficiently high by determining the density of the entire molded article.

Density of the Molded Article

The density of the molded article is preferably from 1.56 g/cm$^3$ to 1.70 g/cm$^3$, more preferably from 1.57 g/cm$^3$ to 1.67 g/cm$^3$, and even more preferably from 1.58 g/cm$^3$ to 1.65 g/cm$^3$. When the density of the molded article is within the range described above, the molded article can be used in applications requiring a high strength. Note that reference to the density of the molded article alone indicates the density that is determined by considering the entire molded article as a test piece.

Density of Portion Located at the Deepest Part of the Molded Article

The density of the portion located at the deepest part of the molded article is preferably from 1.56 g/cm$^3$ to 1.70 g/cm$^3$, more preferably from 1.57 g/cm$^3$ to 1.67 g/cm$^3$, and even more preferably from 1.58 g/cm$^3$ to 1.65 g/cm$^3$. When the density of the portion located at the deepest part of the molded article is within the range described above, a molded article with a high strength can be provided.

Density of Portions Located on the Surface of the Molded Article

The density of the portion located on the surface of the molded article is preferably from 1.56 g/cm$^3$ to 1.70 g/cm$^3$, more preferably from 1.57 g/cm$^3$ to 1.67 g/cm$^3$, and even more preferably from 1.58 g/cm$^3$ to 1.65 g/cm$^3$. A molded article with a high strength can be provided by setting the density of portions located on the surface of the molded article to be within the range described above.

Difference Between the Density of the Portion Located at the Deepest Part and the Density of the Portion Located on the Surface of the Molded Article In the present embodiment, the difference between the density of the portion located at the deepest part of the molded article and the density of the portion located on the surface of the molded article is preferably less than 0.02 g/cm$^3$ and more preferably not greater than 0.01 g/cm$^3$. When the difference between the density of the portion located at the deepest part of the molded article and the density of the portion located on the surface of the molded article is within the range described above, a molded article with uniform density can be provided. Therefore, an advantage is provided of being able to prevent damage to the molded article resulting from a concentration of stress at locations with a low density, which is attributed to the non-uniform density of the molded article.

Well Drilling Method

The method for well drilling to drill a well or for well processing using the molded article according to the present embodiment is also within the scope of the present invention.

Well Drilling

In the present specification, well drilling refers to drilling through the ground to provide a well in order to obtain a hydrocarbon resource such as petroleum or natural gas, and it also further refers to drilling a well that has been provided. Well drilling according to the present embodiment is not particularly limited. For example, known well drilling can be performed.

Well Processing

In the present specification, "well processing" refers to an operation, excluding drilling, in a series of processes performed in a well in order to obtain a hydrocarbon resource such as petroleum or natural gas. For example, well processing indicates processing a well through hydraulic fracturing, plugging or fixing a borehole, and the like. Well processing according to the present embodiment is not particularly limited. For example, known well processing can be performed.

As is clear from the description above, the molded article according to the present embodiment preferably has a density of from 1.56 g/cm$^3$ to 1.70 g/cm$^3$. Additionally, for the molded article according to the present embodiment, the density of the portion located at the deepest part of the molded article is preferably from 1.56 g/cm$^3$ to 1.70 g/cm$^3$. Furthermore, for the molded article according to the present embodiment, the density of the portion located on the surface of the molded article is from 1.56 g/cm$^3$ to 1.70 g/cm$^3$. Additionally, for the molded article of the present embodiment, the difference between the density of the portion located at the deepest part and the density of a portion located on the surface of the molded article is preferably less than 0.02 g/cm$^3$.

Moreover, the molded article according to the present embodiment is preferably a frac ball. Furthermore, the molded article according to the present embodiment is preferably a mandrel provided in a plug for well drilling.

Furthermore, in the method of producing a molded article according to the present embodiment, the glycolic acid monomer is preferably glycolide. In addition, in the method of producing a molded article according to the present embodiment, the mold is flexible, and after the composition is injected into the mold, the mold is sealed and then immersed in a liquid, and the composition is subjected to the pressurized condition by applying pressure to the liquid.

EXAMPLES

An embodiment of the present invention will be described in further detail hereinafter on the basis of examples, but the present invention is not limited thereto.

Measurement of the Uniaxial Compressive Strength

A 4 mm thick test piece with a cross-sectional area of 10 mm×10 mm was compressed at a rate of 10 mm/min in accordance with JIS K7178, and a compressive strain-compressive stress curve was obtained. The inflection point of the obtained compressive strain-compressive stress curve was taken as the uniaxial compressive strength. When the test piece fractured prior to inflection, the stress at the time of fracturing was taken as the uniaxial compressive strength.

Density Measurement

The density was measured through the Archimedes' method using a specific gravity measurement kit AD-1653 available from A&D Co., Ltd. and ethanol at a temperature of 25° C. The density of a test piece cut out from the portion located at the deepest part and the density of a test piece cut out from a portion located on the surface were respectively measured. The densities of two test pieces were measured at each location, and the average value thereof was calculated.

Measurement of Weight Average Molecular Weight

Approximately 10 mg cut from the test piece was immersed in 0.5 mL of DMSO, heated at 150° C., and then cooled to room temperature to obtain a sample solution. The sample solution was diluted in a measuring flask to 10 mL with hexafluoroisopropanol (hereinafter, also referred to as HFIP), and then measured. A Shodex GPC-104 (detector: RI, column: HFIP-606M×2) was used as the measurement device. A solvent in which $CF_3COONa$ was dissolved in HFIP at a concentration of 5 mM was used as the solvent. The weight average molecular weight was calculated using polymethyl methacrylate (also referred to as PMMA) as the standard substance for determining the weight average molecular weight.

Measurement of the Concentration of Unreacted Glycolide 2 mL of dimethyl sulfoxide (also referred to as DMSO) containing 0.4 mg of 4-chlorobenzophenone (also referred to as CBP) as the internal standard substance was added to approximately 100 mg cut from the test piece, and heated and dissolved for approximately 10 minutes at 150° C., and then cooled to room temperature, after which the mixture was filtered to obtain a filtrate. The filtrate was analyzed by gas chromatography. A GC-2010 was used as the measuring device. The column temperature was set to 150° C. for 5 minutes, after which the temperature was increased at a rate of 20° C./min, and then maintained at 270° C. for 3 minutes. The injection temperature was set to 180° C.

Sample Preparation

Example 1

Propylene glycol was added to the glycolide such that the propylene glycol became 0.15 mol %, and the mixture was heated to 100° C. to melt the glycolide, after which tin dichloride dihydrate (available from Kanto Chemical Co., Inc.) was added as a catalyst so as to become 30 ppm, and a composition was thereby prepared. A sample was prepared by injecting 120 g of the molten composition into a silicone tube with one end sealed having a wall thickness of 3 mm, an inner diameter of 32 mmφ, and a length of 150 mm, degassing the composition, and sealing the injection port with a silicone plug. The sample was inserted into a PET bag provided with an Al laminate layer. The inside of the PET bag was then degassed under vacuum, and the opening of the PET bag was sealed by heat fusion.

Examples 2 to 9 and Comparative Examples 1 and 2

Samples of Examples 2 to 9 and Comparative Examples 1 and 2 were prepared in the same manner as in Example 1.

Polymerization Under Pressure in WIP Device

Example 1

A silicone oil was circulated in a WIP device (container size: 60 mmφ×180 mm long, maximum load: 980 MPa) available from Kobe Steel, Ltd., and the silicone oil was heated to a predetermined temperature. The sample was immersed in the silicone oil heated in the WIP device and was heated at normal pressure for 10 minutes. The silicone oil was pressurized to 50 MPa, and the composition in the sample was polymerized at 170° C. for 2 hours. After the completion of the polymerization, the WIP device was depressurized, and the sample was removed from the WIP device.

Examples 2 to 9 and Comparative Examples 1 and 2

Examples 2 to 9 and Comparative Examples 1 and 2 were polymerized in the same manner as in Example 1 with the exception that the pressure conditions, the temperature conditions, and the reaction times were used as shown in Table 1.

Evaluation

The molded article was removed from the silicone tube, and the respective test pieces of a size of 10 mm×10 mm×4 mm were cut from the portion located at the deepest part of the molded article and the portion located on the surface of the molded article. The test pieces were then used to evaluate the uniaxial compressive strength, density, weight average molecular weight, and unreacted glycolide concentration. The results are shown in Table 1.

TABLE 1

| | Temperature (° C.) | Reaction Time (h) | Pressure (MPa) | Weight Average Molecular Weight | Unreacted Glycolide Concentration (wt %) | Density of Portion Located at the Deepest Part (g/cm$^3$) | Density of Portion Located on Surface (g/cm$^3$) | Uniaxial Compressive strength of Portion Located at the Deepest Part (MPa) | Uniaxial Compressive strength of Portion Located on Surface (MPa) |
|---|---|---|---|---|---|---|---|---|---|
| Example 1 | 170 | 2 | 50 | 162,000 | 0.3 | 1.59 | 1.59 | 282 | 293 |
| Example 2 | 170 | 2 | 100 | 215,000 | 0.3 | 1.60 | 1.59 | 277 | 290 |
| Example 3 | 170 | 2 | 120 | 180,000 | 0.3 | 1.59 | 1.60 | 279 | 291 |
| Example 4 | 170 | 2 | 150 | 138,000 | 10.7 | 1.60 | 1.59 | 262 | 268 |
| Example 5 | 180 | 1.5 | 150 | 196,000 | 0.3 | 1.59 | 1.59 | 319 | 323 |
| Example 6 | 180 | 3 | 150 | 179,000 | 1.3 | 1.60 | 1.60 | 295 | 307 |
| Example 7 | 190 | 1.5 | 50 | 189,000 | 0.2 | 1.57 | 1.57 | 267 | 267 |
| Example 8 | 190 | 1.5 | 150 | 210,000 | 0.2 | 1.59 | 1.59 | 328 | 328 |
| Example 9 | 190 | 3 | 150 | 210,000 | 0.3 | 1.60 | 1.60 | 328 | 328 |
| Comparative Example 1 | 170 | 2 | 0.1 | 204,000 | 0.7 | 1.55 | 1.57 | 160 | 244 |
| Comparative Example 2 | 170 | 2 | 200 | 61,000 | 83.7 | N/A | N/A | N/A | N/A |

As shown in Table 1, in Examples 1 to 9, molded articles with a uniaxial compressive strength at 23° C. of greater than 250 MPa and not greater than 350 MPa could be obtained. The molded article of Comparative Example 1 had a uniaxial compressive strength of from 160 MPa to 244 MPa, which was low. In Comparative Example 2, the polymerization of glycolide did not proceed, the molded article was crushed by merely touching by hand, and a molded article having sufficient strength could not be obtained.

In addition, in Examples 1 to 9, molded articles were obtained of which the density of the portion located at the deepest part was from 1.56 g/cm$^3$ to 1.70 g/cm$^3$, the density of the portion located on the surface was from 1.56 g/cm$^3$ to 1.70 g/cm$^3$, and the difference between the density of the portion located at the deepest part and the density of the portion located on the surface was less than 0.02 g/cm$^3$. In contrast, for the molded article of Comparative Example 1, the density of the portion located at the deepest part was 1.55 g/cm³, which was low. In addition, for the molded article of Comparative Example 1, the difference between the density of the portion located at the deepest part and the density of the portion located on the surface was 0.02 g/cm³, which was high. In Comparative Example 2, the polymerization of glycolide did not proceed, a molded article having sufficient strength could not be obtained, and therefore the density could not be measured.

The present invention is not limited to the embodiments described above, and various modifications can be made within the scope indicated in the claims. Embodiments obtained by appropriately combining the technical means disclosed in different embodiments are also included in the technical scope of the present invention.

INDUSTRIAL APPLICABILITY

The present invention has a uniaxial compressive strength at a temperature of 23° C. of greater than 250 MPa and not greater than 350 MPa and therefore can be used as a member for well drilling requiring a high strength.

The invention claimed is:

1. A method of producing a molded article comprising an aliphatic polyester, the method comprising:
   an injection step of injecting a composition comprising monomers into a mold; and
   a polymerizing step of converting the monomers into the aliphatic polyester within the mold at a temperature of from 150° C. to 200° C. under a pressurized condition with a pressure of not less than 10 MPa and less than 180 MPa, and obtaining the molded article comprising the aliphatic polyester, wherein
   the monomers include glycolic acid monomers, and a content of the glycolic acid monomers in the composition is not less than 70 mass %.

2. The method of producing a molded article according to claim 1, wherein the glycolic acid monomer is glycolide.

3. The method of producing a molded article according to claim 1, wherein the mold is flexible; and
   after the composition is injected into the mold, the mold is sealed and then immersed in a liquid, and the composition is subjected to the pressurized condition by applying pressure to the liquid.

* * * * *